United States Patent
Bae et al.

(10) Patent No.: US 8,953,021 B2
(45) Date of Patent: Feb. 10, 2015

(54) IMAGE PROCESSING SYSTEMS FOR INCREASING RESOLUTION OF THREE-DIMENSIONAL DEPTH DATA

(75) Inventors: Kwang-Hyuk Bae, Seoul (KR); Kyu-Min Kyung, Seoul (KR); Tae-Chan Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 386 days.

(21) Appl. No.: 13/337,724

(22) Filed: Dec. 27, 2011

(65) Prior Publication Data

US 2012/0169848 A1  Jul. 5, 2012

(30) Foreign Application Priority Data

Dec. 29, 2010  (KR) .................. 10-2010-0137537

(51) Int. Cl.
*H04N 13/02* (2006.01)
*G01S 7/486* (2006.01)
*G01S 17/02* (2006.01)
*G01S 17/89* (2006.01)

(52) U.S. Cl.
CPC .......... *H04N 13/0253* (2013.01); *G01S 7/4861* (2013.01); *G01S 17/023* (2013.01); *G01S 17/89* (2013.01)
USPC .......................................................... 348/46

(58) Field of Classification Search
CPC .......... H04N 13/0271; H04N 13/0048; H04N 13/0253; G06T 7/0075
USPC ...................................... 348/43, 46; 382/154
See application file for complete search history.

(56) References Cited

U.S. PATENT DOCUMENTS

| | | | | |
|---|---|---|---|---|
| 5,746,210 | A * | 5/1998 | Benaron et al. | 600/473 |
| 8,159,598 | B2 * | 4/2012 | Watanabe et al. | 348/345 |
| 8,428,342 | B2 * | 4/2013 | Tian et al. | 382/154 |
| 8,482,722 | B2 * | 7/2013 | Min et al. | 356/5.1 |
| 2005/0041759 | A1 * | 2/2005 | Nakano | 375/324 |
| 2008/0231832 | A1 * | 9/2008 | Sawachi | 356/5.1 |
| 2009/0020687 | A1 * | 1/2009 | Lehmann et al. | 250/208.1 |
| 2009/0273717 | A1 | 11/2009 | Masaoka et al. | |
| 2010/0046802 | A1 | 2/2010 | Watanabe et al. | |
| 2011/0025827 | A1 * | 2/2011 | Shpunt et al. | 348/47 |
| 2011/0097008 | A1 | 4/2011 | Cao et al. | |
| 2011/0285910 | A1 * | 11/2011 | Bamji et al. | 348/631 |
| 2012/0095575 | A1 * | 4/2012 | Meinherz et al. | 700/79 |
| 2012/0123718 | A1 * | 5/2012 | Ko et al. | 702/85 |
| 2012/0200669 | A1 * | 8/2012 | Lai et al. | 348/43 |

FOREIGN PATENT DOCUMENTS

| | | |
|---|---|---|
| JP | 2009100373 A | 5/2009 |
| JP | 2010071976 A | 4/2010 |
| KR | 20100047885 A | 5/2010 |

\* cited by examiner

*Primary Examiner* — David Harvey
(74) *Attorney, Agent, or Firm* — Harness, Dickey & Pierce, P.L.C.

(57) ABSTRACT

An image processing system includes a calculation unit, a reconstruction unit, a confidence map estimation unit and an up-sampling unit. The up-sampling unit is configured to perform a joint bilateral up-sampling on depth information of a first input image based on a confidence map of the first input image and a second input image with respect to an object and increase a first resolution of the first input image to a second resolution to provide an output image with the second resolution.

13 Claims, 11 Drawing Sheets

IMAGE PROCESSING SYSTEMS FOR INCREASING RESOLUTION OF THREE-DIMENSIONAL DEPTH DATA

CROSS-REFERENCE TO RELATED APPLICATIONS

This U.S. non-provisional application claims the benefit of priority under 35 U.S.C. §119 to Korean Patent Application No. 10-2010-0137537 filed on Dec. 29, 2010 in the Korean Intellectual Property Office (KIPO), the entire contents of which are incorporated herein by reference in its entirety.

BACKGROUND

1. Technical Field

Example embodiments relate to image sensors. More particularly, example embodiments relate to image processing systems.

2. Description of the Related Art

An image sensor is a photo-detection device that converts optical signals including image and/or distance (i.e., depth) information about an object into electrical signals. Various types of image sensors, such as charge-coupled device (CCD) image sensors, CMOS image sensors (CISs), etc., have been developed to provide high quality image information about the object. Recently, a three-dimensional (3D) image sensor is being researched and developed which provides depth information as well as two-dimensional image information.

The three-dimensional image sensor may obtain the depth information using infrared light or near-infrared light as a light source. In a conventional three-dimensional image sensor, resolution of depth data of the three-dimensional image sensor is lower than resolution of two-dimensional color data.

SUMMARY

At least some example embodiments provide an image processing system capable of increasing resolution of three-dimensional depth data.

According to at least some example embodiments, an image processing system includes a calculation unit, a reconstruction unit, a confidence map estimation unit and an up-sampling unit. The calculation unit is configured to calculate a phase difference between an emitted light and a first received light reflected from an object due to the emitted light, calculate an amplitude that indicates an intensity of the first received light and calculate an offset of the first received light. The reconstruction unit is configured to reconstruct the first received light based on the phase difference and provides a reconstruction error, the reconstruction error corresponding to intensity differences between sampling points of the first received light and corresponding sampling points of the reconstructed first received light. The confidence map estimation unit is configured to determine a confidence map based on the amplitude, the offset and the reconstruction error, the confidence map associated with a first input image generated based on the first received light, the first input image having a first resolution. The up-sampling unit is configured to perform a joint bilateral up-sampling on depth information of the phase difference of the first input image based on the confidence map and a second input image of the object, the up-sampling increases the first resolution of the first input image to a second resolution to provide an output image with the second resolution.

In at least some example embodiments, the second input image may have the second resolution, the second resolution higher than the first resolution.

In at least some example embodiments, the first input image may be a three-dimensional (3-D) depth image with respect to the object and the second input image may be a two-dimensional (2-D) color image with respect to the object.

In at least some example embodiments, the output image may be a three-dimensional (3-D) depth image with respect to the object.

In at least some example embodiments, the up-sampling unit is configured to perform the joint bilateral up-sampling by $$\tilde{D}_P = \frac{1}{k_p} \sum_{q_\downarrow \in \Omega} D_{q_\downarrow}$$

$$f(\|p_\downarrow - q_\downarrow\|)\left[\alpha(\Delta_\Omega)g(\|\tilde{I}_p - \tilde{I}_q\|) + (1 - \alpha(\Delta_\Omega))h(\|I_{P_\downarrow} - I_{q_\downarrow}\|)\right] \cdot U(q_\downarrow)$$

wherein $\tilde{I}_p$ denotes intensity of a center pixel of the second input image, $\tilde{I}_q$ denotes an intensity of a circumferential pixel surrounding the center pixel of the second input image, $I_{P\downarrow}$ denotes an intensity of a center pixel of the first input image, $I_{q\downarrow}$ denotes an intensity of a circumferential pixel of the first input image, $\Omega$ denotes a region of the circumferential pixels, $p\downarrow$ and $q\downarrow$ respectively denote pixels corresponding to the center pixel and the circumferential pixel of the first input image, $D_{q\downarrow}$ denotes a depth value of the corresponding pixel in the first input image, $\tilde{D}_p$ denotes a depth value of the corresponding pixel in the output image, f denotes a spatial filter kernel, g and h denote range filter kernels, $\alpha(\Delta_\Omega)$ denotes a blending function, $k_p$ denotes a normalizing factor and $U(q\downarrow)$ is expressed by $$U(q_\downarrow) = \begin{cases} \dfrac{1}{1 + e^{-\varepsilon_4(C(q_\downarrow) - \mu_{P_\downarrow})}}, & \text{if } T_{low} < \sigma_{P_\downarrow}^2 < T_{high} \\ \text{all } 1, & \text{otherwise} \end{cases}$$

where $$\mu_{P_\downarrow} = \frac{1}{k_C} \sum_{q_\downarrow \in \Omega} C(q_\downarrow),$$

$$\sigma_{P_\downarrow}^2 = \frac{1}{k_C} \sum_{q_\downarrow \in \Omega} (C(q_\downarrow) - \mu_{P_\downarrow})^2$$

and $C(q\downarrow)$ denotes the confidence map.

The confidence map $C(q\downarrow)$ is expressed by $$C(q\downarrow) = w_A C_A + w_B C_B + w_{RE} C_{RE},$$

where $$C_A = \frac{1}{1 + e^{-\varepsilon_1 \cdot (A - \tau_1)}},$$

$C_B = e^{-(B - \tau_2)^2/\epsilon_2^2}$ and $C_{RE} = e^{-\epsilon_3 \cdot RE}$ A is the amplitude, B is the offset, R is the reconstruction error, $\tau_1, \tau_2$ denote center values, $\epsilon_1, \epsilon_2, \epsilon_3$ denote constants determining slopes of $C_A$, $C_B$ and $C_{RE}$ and $w_A$, $w_B$ and $w_R$ denote weights to $C_A$, $C_B$ and $C_R$, respectively.

Each of f, g and h denotes a Gaussian function.

The blending function $\alpha(\Delta_\Omega)$ is expressed by $$\alpha(\Delta_\Omega) = \frac{1}{1+e^{-\varepsilon(\Delta_\Omega-\tau)}},$$

where the $\Delta_\Omega$ denotes a difference of the maximum and minimum depth values of the region of the circumferential pixels.

In at least some example embodiments, the up-sampling unit is configured to perform the joint bilateral up-sampling based on reflectances of pixels of an image sensor configured to generate the first input image.

According to at least some example embodiments, an image processing system includes a first image sensor, a second image sensor and an up-sampling unit. The first image sensor includes a light source module, the first image sensor configured to generate a first input image with a first resolution based on a first received light reflected from an object due to an emitted light from the light source module, the first image sensor further configured to provide a confidence map with respect to the first input image. The second image sensor is configured to provide a second input image based on a second received light reflected from the object, the second image having a second resolution higher than the first resolution. The up-sampling unit is configured to perform a joint bilateral up-sampling on depth information of the first input image based on the confidence map and the second input image, the up-sampling unit configured to provide an output image with the second resolution based on the up-sampling.

In at least some example embodiments, the first image sensor includes a calculation unit which is configured to calculate a phase difference of the first received light, calculate an amplitude indicating an intensity of the first received light and calculate an offset of the first received light, a reconstruction unit which is configured to reconstruct the first received light based on the phase difference and provide a reconstruction error corresponding to intensity differences between sampling points of the first received light and corresponding sampling points of the reconstructed first received light, and a confidence map estimation unit which is configured to determine a confidence map based on the amplitude, the offset and the reconstruction error.

The calculation unit is configured to calculate the amplitude and the offset by sampling the first received light at sampling points of the emitted light during one period of the emitted light.

In at least some example embodiments, the first input image is a three-dimensional (3-D) depth image with respect to the object and the second input image is a two-dimensional (2-D) color image with respect to the object.

In at least some example embodiments, the output image is a three-dimensional (3-D) depth image with respect to the object.

At least another example embodiment discloses an image processing system including a first image sensor including a pixel array having a plurality of pixels, the pixels configured to produce pixel values, the first image sensor configured to generate a first input image based on the pixel values, a second image sensor configured to generate a second input image and an up-sampling unit configured to up-sample the first input image based on the second input image and a variance of the pixel values associated with at least one pixel of the plurality of pixels.

As described above, a resolution of 3-D depth data may be increased to a resolution of 2-D color data by adaptive joint bilateral up-sampling.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF EXAMPLE EMBODIMENTS

Figure 1:
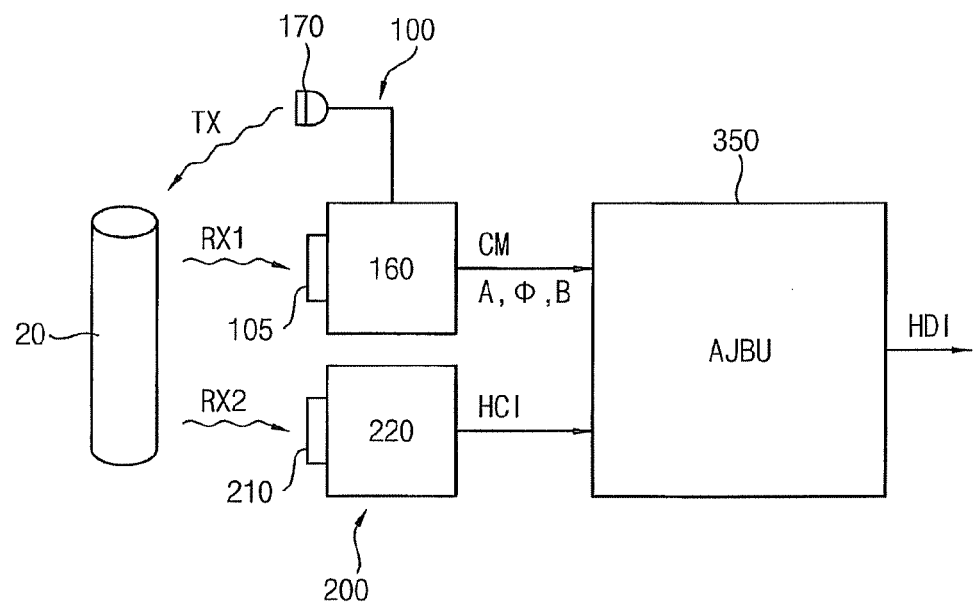
FIG. 1 is a block diagram illustrating an image processing system according to at least some example embodiments.

Various example embodiments will be described more fully hereinafter with reference to the accompanying drawings, in which some example embodiments are shown. Inventive concepts may, however, be embodied in many different forms and should not be construed as limited to example embodiments set forth herein. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of inventive concepts. As used herein, the singular forms "a," "an" and "the" are intended to include the plural forms as well, unless the context clearly indicates otherwise. It will be further understood that the terms "includes," "including," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which inventive concepts belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image processing system according to at least some example embodiments.

Referring to FIG. 1, an image processing system 10 includes a first image sensor 100, a second image sensor 200 and an up-sampling unit 350.

The first image sensor 100 includes a light source module 170, a first filter 105 and a main body 160. The light source module 170 may emit light TX of a predetermined wavelength to an object 20, and the first image sensor 100 receives a light RX1 reflected from the object 20. The first filter 105 may be an infrared filter, and the main body 160 receives infrared components from the first received light RX1. The main body 160 processes the first received light RX1 to generate a first input image LDI (Refer to FIG. 2) with a first resolution. The main body 160 further provides a confidence map CM based on the first input image LDI.

The second image sensor 200 includes a second filter 210 and a main body 220. The second image sensor 200 receives a second light RX2 reflected from the object 20. The second filter 210 may be a color filter, and the main body 220 receives color components from the second received light RX2. The main body 220 processes the second received light RX2 to generate a second input image HCI with a second resolution.

The first image sensor 100 and the second image sensor 200 are arranged along a same axis, and thus the first image sensor 100 and the second image sensor 200 may capture the same portion of the object 20.

In at least some example embodiments, the first image sensor 100 may be a three-dimensional (3-D) time-of-flight (TOF) image sensor, and the second image sensor 200 may be a two-dimensional (2-D) color image sensor. Therefore, the first input image LDI may be a 3-D depth image, and the second input image HCI may be a 2-D color image. Accordingly, the second resolution of the second input image HCI may be higher than the first resolution of the first input image LDI.

The up-sampling unit 350 adaptively performs a joint bilateral up-sampling on depth information of a phase difference Φ using the first input image LDI and the second input image HCI and increases the first resolution of the first input image LDI to the second resolution to provide an output image HDI with the second resolution. Therefore, an output image HDI includes depth information with the second resolution and color information. As will be later with reference to FIGS. 2 and 4, an image signal processor 300 estimates the confidence map CM by calculating an amplitude A, an offset B and a reconstruction error RE of the first input image LDI, and increases the first resolution of the first input image LDI to the second resolution by adaptively selecting coefficients when the up-sampling is performed on the depth information of the phase difference Φ based on the confidence map CM. That is, the image signal processor 300 calculates a depth value of one pixel of the first input image LDI by considering reflectivity of pixels adjacent to the one pixel.

Figure 2:
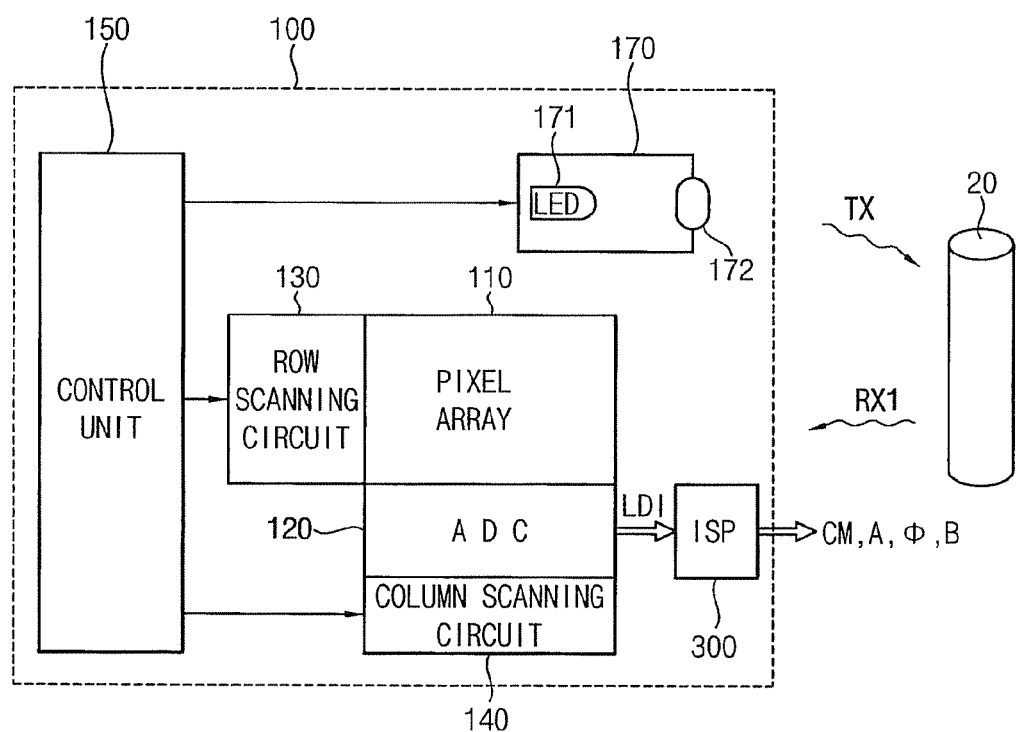
FIG. 2 is a block diagram illustrating an example of the first image sensor in FIG. 1 according to at least some example embodiments.

FIG. 2 is a block diagram illustrating an example of the first image sensor in FIG. 1 according to at least some example embodiments.

Referring to FIG. 2, the first image sensor 100 includes a pixel array 110, an analog-to-digital conversion (ADC) unit 120, a row scanning circuit 130, a column scanning circuit 140, a control unit 150 and the light source module 170.

The pixel array 110 may include depth pixels receiving the first light RX1 that is emitted by the light source module 170 and reflected from an object 20. The depth pixels may convert the first received light RX1 into electrical signals. The depth pixels may provide information about a distance of the object 20 from the first image sensor 100 and/or black-and-white image information.

The pixel array 110 may further include color pixels for providing color image information. In this case, the first image sensor 100 may be a three-dimensional color image sensor that provides the color image information and the depth information. In some embodiments, an infrared filter or a near-infrared filter may be formed on the depth pixels, and a color filter (e.g., red, green and blue filters) may be formed on the color pixels. A ratio of the number of the depth pixels to the number of the color pixels may vary according to example embodiments.

The ADC unit 120 may convert an analog signal output from the pixel array 110 into a digital signal. In at least some example embodiments, the ADC unit 120 may perform a column ADC that converts analog signals in parallel using a plurality of analog-to-digital converters respectively coupled to a plurality of column lines. In other example embodiments, the ADC unit 120 may perform a single ADC that sequentially converts the analog signals using a single analog-to-digital converter.

In some example embodiments, the ADC unit 120 may further include a correlated double sampling (CDS) unit for extracting an effective signal component. In some example embodiments, the CDS unit may perform an analog double sampling that extracts the effective signal component based on a difference between an analog reset signal including a reset component and an analog data signal including a signal component. In other example embodiments, the CDS unit may perform a digital double sampling that converts the analog reset signal and the analog data signal into two digital signals and extracts the effective signal component based on a difference between the two digital signals. In still other example embodiments, the CDS unit may perform a dual correlated double sampling that performs both the analog double sampling and the digital double sampling.

The row scanning circuit 130 may receive control signals from the control unit 150, and may control a row address and a row scan of the pixel array 110. To select a row line among a plurality of row lines, the row scanning circuit 130 may apply a signal for activating the selected row line to the pixel array 110. In at least some example embodiments, the row scanning circuit 130 may include a row decoder that selects a row line of the pixel array 110 and a row driver that applies a signal for activating the selected row line.

The column scanning circuit 140 may receive control signals from the control unit 150, and may control a column address and a column scan of the pixel array 110. The column scanning circuit 140 may output a digital output signal from the ADC unit 120 to a digital signal processing circuit (not shown) or to an external host (not shown). For example, the column scanning circuit 140 may provide the ADC unit 120 with a horizontal scan control signal to sequentially select a plurality of analog-to-digital converters included in the ADC unit 120. In at least some example embodiments, the column scanning circuit 140 may include a column decoder that selects one of the plurality of analog-to-digital converters and a column driver that applies an output of the selected analog-to-digital converter to a horizontal transmission line. The horizontal transmission line may have a bit width corresponding to that of the digital output signal.

The control unit 150 may control the ADC unit 120, the row scanning circuit 130, the column scanning circuit 140 and the light source module 170. The control unit 150 may provide the ADC unit 120, the row scanning circuit 130, the column scanning circuit 140 and the light source module 170 with control signals, such as a clock signal, a timing control signal, etc. In at least some example embodiments, the control unit 150 may include a control logic circuit, a phase locked loop circuit, a timing control circuit, a communication interface circuit, etc.

The light source module 170 may emit light TX of a predetermined wavelength. For example, the light source module 170 may emit infrared light or near-infrared light. The light source module 170 may include a light source 171 and a lens 172. The light source 171 may be controlled by the control unit 150 to emit the light TX of which the intensity periodically changes. For example, the intensity of the light TX may be controlled such that the intensity of the light TX has a waveform of a pulse wave, a sine wave, a cosine wave, etc. The light source 171 may be implemented by a light emitting diode (LED), a laser diode, etc. The lens 172 may be configured to adjust an emission angle of the light TX output from the light source 171. For example, an interval between the light source 171 and the lens 172 may be controlled by the control unit 150 to adjust the emission angle of the light TX.

Hereinafter, an operation of the first image sensor 100 according to at least some example embodiments will be described below.

The control unit 150 may control the light source module 170 to emit the light TX having the periodic intensity. The light TX emitted by the light source module 170 may be reflected from the object 20 back to the first image sensor 100 as the first received light RX1. The first received light RX1 may enter the depth pixels, and the depth pixels may be activated by the row scanning circuit 130 to output analog signals corresponding to the received light RX1. The ADC unit 120 may convert the analog signals output from the depth pixels into digital data. The digital data may be provided to the image signal processor 300 as the first input image LDI. The first input image LDI may be converted to the distance information in the image signal processor 300. When the pixel array 110 includes the color pixels, the color image information in addition to the distance information may be provided to the image signal processor 300.

Figure 3:
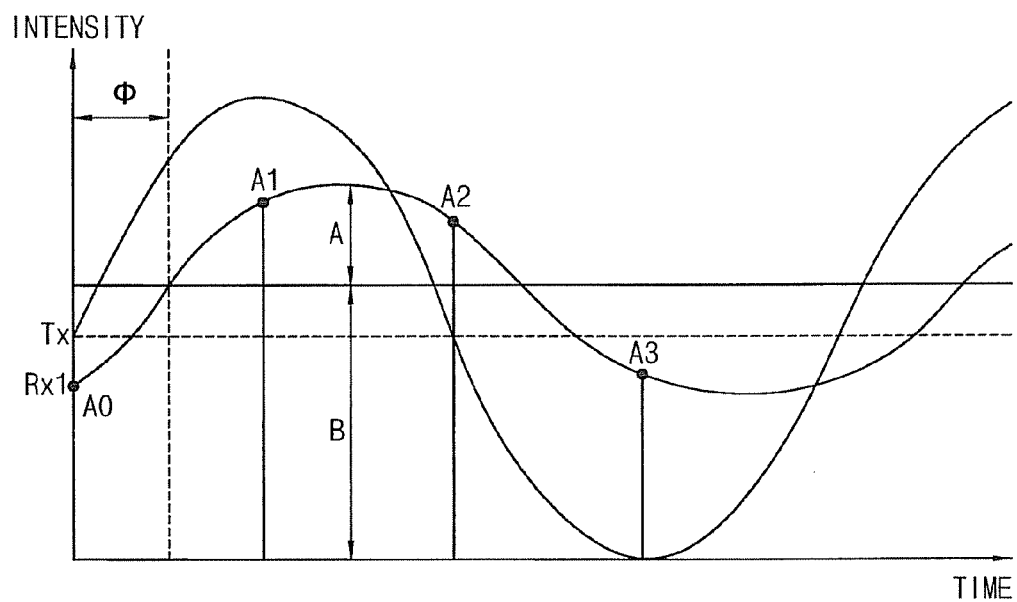
FIG. 3 illustrates emitted light and first received light in FIG. 1.

FIG. 3 illustrates the emitted light and the first received light in FIG. 1.

Referring to FIGS. 1 and 3, the light TX emitted by the light source module 170 may have a periodic intensity. For example, the intensity (i.e., the number of photons per unit area) of the light TX may have a waveform of a sine wave.

The light TX emitted by the light source module 170 may be reflected from the object 20, and then may enter a pixel array 110 as first received light RX1. The pixel array 110 may periodically sample the first received light RX1. In some example embodiments, during each period of the first received light RX1 (i.e., period of the transmitted light TX), the pixel array 110 may perform a sampling on the first received light RX1 with two sampling points having a phase difference of about 180 degrees, with four sampling points having a phase difference of about 90 degrees, or with more than four sampling points. For example, the pixel array 110 may extract four samples A0, A1, A2 and A3 of the first received light RX1 at phases of about 90 degrees, about 180 degrees, about 270 degrees and about 360 degrees per period, respectively.

The first received light RX1 may have an offset B that is different from an offset of the light TX emitted by the light source module 170 due to background light, a noise, etc. The offset B of the received light RX1 may be calculated by Equation 1.

$$B = \frac{A0 + A1 + A2 + A3}{4} \quad \text{[Equation 1]}$$

Here, A0 represents an intensity of the first received light RX1 sampled at a phase of about 90 degrees of the emitted light TX, A1 represents an intensity of the first received light RX1 sampled at a phase of about 180 degrees of the emitted light TX, A2 represents an intensity of the first received light RX1 sampled at a phase of about 270 degrees of the emitted light TX, and A3 represents an intensity of the first received light RX1 sampled at a phase of about 360 degrees of the emitted light TX.

The first received light RX1 may have an amplitude lower than that of the light TX emitted by the light source module 170 due to a light loss. The amplitude A of the first received light RX1 may be calculated by Equation 2.

$$A = \frac{\sqrt{(A_3 - A_1)^2 + (A_0 - A_2)^2}}{2} \quad \text{[Equation 2]}$$

Black-and-white image information about the object 20 may be provided by respective depth pixels included in the pixel array 110 based on the amplitude A of the first received light RX1.

The first received light RX1 may be delayed by a phase difference Φ corresponding to a double of the distance of the object 20 from the first image sensor 100 with respect to the emitted light TX. The phase difference Φ between the emitted light TX and the first received light RX1 may be calculated by Equation 3.

$$\varphi = \tan^{-1} \frac{A_3 - A_1}{A_0 - A_2} \quad \text{[Equation 3]}$$

The phase difference Φ between the emitted light TX and the first received light RX1 may correspond to a time-of-flight (TOF). The distance of the object 20 from the three-dimensional image sensor 100 may be calculated by an equation, "R=c*TOF/2", where R represents the distance of the object 20 from the three-dimensional image sensor 100, and c represents the speed of light. Further, the distance of the object 20 from the first image sensor 100 may also be calculated by Equation 4 using the phase difference Φ between the emitted light TX and the first received light RX1.

$$R = \frac{c}{4\pi f} \phi \quad \text{[Equation 4]}$$

Here, f represents a modulation frequency, which is a frequency of the intensity of the emitted light TX (or a frequency of the intensity of the first received light RX1).

Here, the amplitude A and the offset B are associated with precision of the depth information. The depth information may be calculated by Equation 5.

$$\Delta L = \frac{L}{360°} \cdot \Delta \varphi = \frac{L}{\sqrt{8}} \frac{\sqrt{B}}{2A} \quad \text{[Equation 5]}$$

Where, L (L=c/(2f)) represents a distance to the object 20.

When the offset B is too small, the amplitude cannot be increased, and when the offset B is too great, pixel is saturated by adjacent light according to Equation 5.

As described above, the first image sensor 100 according to example embodiments may obtain depth information about the object 20, the amplitude A, the offset B, and the phase difference Φ between the emitted light TX and the first received light RX1 using the light TX emitted by the light source module 170. Although FIG. 3 illustrates the emitted light TX of which the intensity is modulated to have a waveform of a sine wave, the first image sensor 100 may use the emitted light TX of which the intensity is modulated to have various types of waveforms according to example embodiments. Further, the first image sensor 100 may extract various information of the first received light RX1 in various manners according to the waveform of the intensity of the emitted light TX, a structure of a depth pixel, etc.

Figure 4:
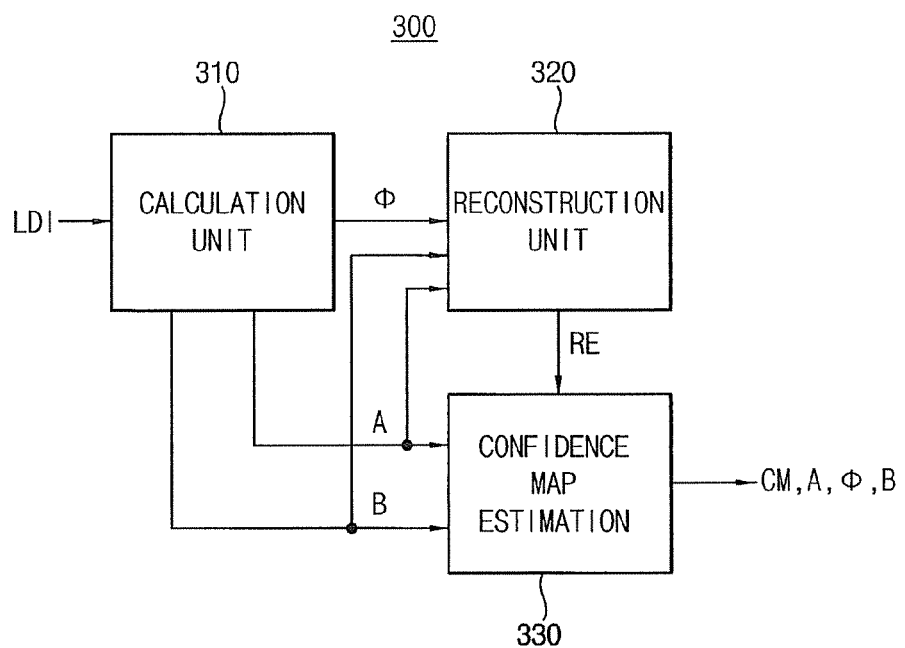
FIG. 4 is a block diagram illustrating an example of an image signal processor in FIG. 2 according to at least some example embodiments.

FIG. 4 is a block diagram illustrating an example of the image signal processor 300 in FIG. 2 according to at least some example embodiments.

Referring to FIG. 4, the image signal processor 300 includes a calculation unit 310, a reconstruction unit 320 and a confidence map estimation unit 330.

The calculation unit 310 may obtain the depth information about the object 20, the offset B, the amplitude A of the first received light RX1 and the phase difference Φ between the emitted light TX and the first received light RX1 based on the first input image LDI. The reconstruction unit 320 reconstructs the first received signal RX1 based on the phase difference Φ between the emitted light TX and the first received light RX1, and selects sampling points in the reconstructed first received light RX1. The reconstruction unit 320 may calculate a reconstruction error RE corresponding to intensity differences between the sampling points of the first received light RX1 and the sampling points of the reconstructed first received light.

The reconstruction error RE may be calculated by Equation 6.

$$RE = \frac{\sum_{i=0}^{3}(Ai - Ai')^2}{4} \quad \text{[Equation 6]}$$

Here, A0', A1', A2', A3' respectively represent intensities of the reconstructed first received light at four sampling points. In addition, A0' is equal to B+(A cos Φ)/2, A1' is equal to B−(A sin Φ)/2, A2' is equal to B−(A cos Φ)/2, and A3' is equal to B+(A sin Φ)/2.

The confidence map estimation unit 330 estimates the confidence map CM based on the amplitude A, the offset B and the reconstruction error RE. The confidence map estimation unit 330 provides the confidence map CM to the up-sampling unit 350.

Figures 5, 6A:
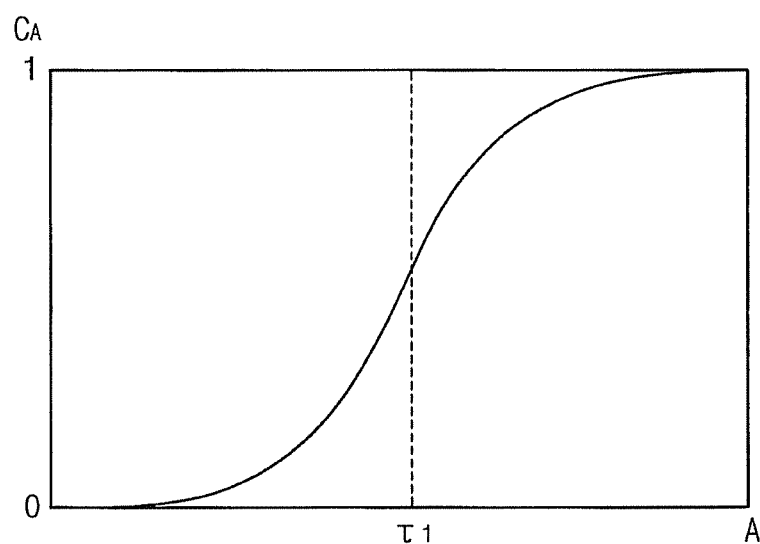
FIG. 5 illustrates a first input image or a second input image in pixel configuration.
FIGS. 6A, 6B and 6C illustrate transfer equations of the amplitude, the offset and the reconstruction error, respectively.

FIG. 5 illustrates the first input image or the second input image in pixel configuration.

In FIG. 5, p denotes a center pixel, q denotes circumferential pixels surrounding the center pixel p, and Ω denotes region of the circumferential pixels q.

The amplitude A may be normalized to a range [0, 1] by Equation 7.

$$C_A = \frac{1}{1 + e^{-\epsilon_1 \cdot (A - \tau_1)}}, \quad \text{[Equation 7]}$$

where $\epsilon_1$ denotes a constant determining a slope of $C_A$.

The offset B may be normalized to a range [0, 1] by Equation 8.

$$C_B = e^{-(B-\tau_2)^2/\epsilon_2^2}, \quad \text{[Equation 8]}$$

where $\epsilon_2$ denotes a constant determining a slope of $C_B$.

The reconstruction error RE may be normalized to a range [0, 1] by Equation 9.

$$C_{RE} = e^{-\epsilon_3 \cdot RE}, \quad \text{[Equation 9]}$$

where $\epsilon_3$ denotes a constant determining a slope of $C_{RE}$.

Here, RE denotes a reconstruction error with respect to the region Ω.

Then the confidence map with respect to the region Ω may be obtained by Equation 10.

$$C(q\downarrow) = w_A C_A + w_B C_B + w_{RE} C_{RE} \quad \text{[Equation 10]}$$

Here, $w_A$, $w_B$ and $w_{RE}$ denote weights to $C_A$, $C_B$ and $C_{RE}$ respectively and $q\downarrow$ is a circumferential pixel (q) in the first input image.

When the region $\Omega$ includes n×n pixels, the amplitude A, the offset A and the reconstruction error RE may be respectively expressed by n×n matrices.

Figure 6B:
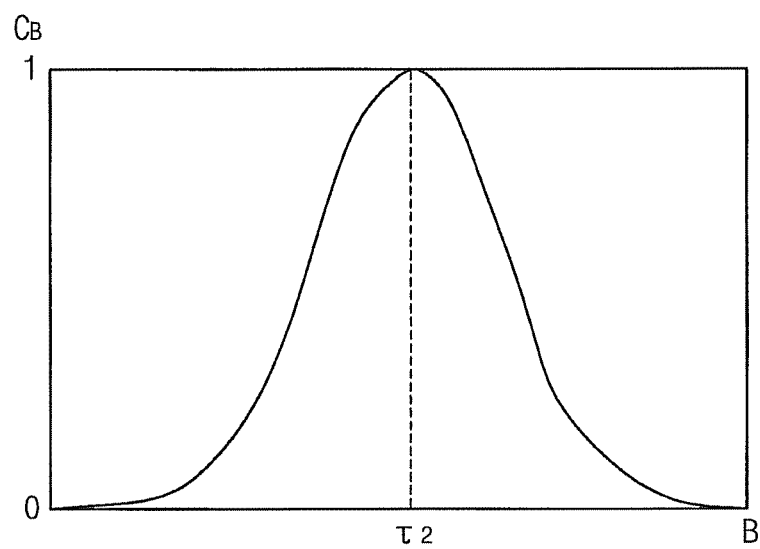
Figure 6C:
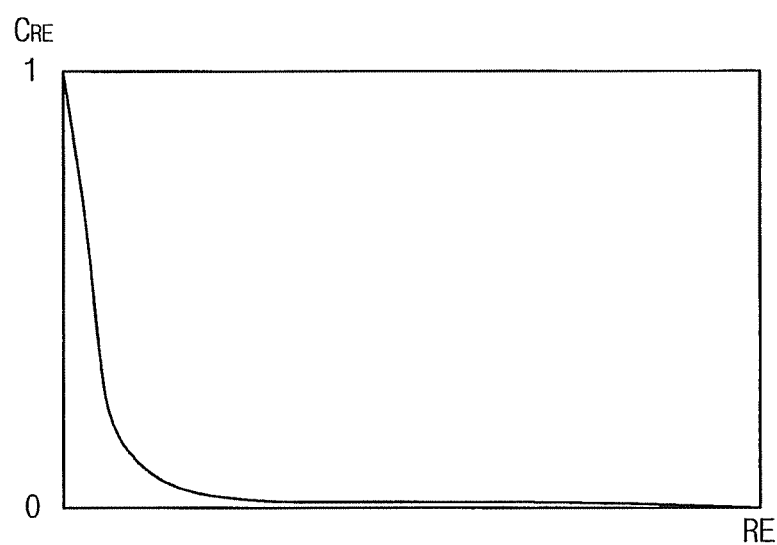

FIGS. 6A, 6B and 6C illustrate transfer equations of the amplitude, the offset and the reconstruction error, respectively.

FIG. 6A corresponds to Equation 7. In FIG. 6A, $\tau_1$ denotes center value and $\epsilon_1$ in Equation 7 determines a slope of the curve of FIG. 6A.

FIG. 6B corresponds to Equation 8. In FIG. 6B, $\tau_2$ denotes center value and $\epsilon_2$ in Equation 8 determines a slope of the curve of FIG. 6B.

FIG. 6C corresponds to Equation 9, and $\epsilon_3$ in Equation 9 determines a slope of the curve of FIG. 6C.

That is, Equation 7, Equation 8 and Equation 9 respectively represent estimation of the amplitude A, the offset A and the reconstruction error RE.

An average $\mu_{p\downarrow}$ of the confidence map in the region $\Omega$ may be calculated by Equation 11.

$$\mu_{p\downarrow} = \frac{1}{k_C} \sum_{q\downarrow \in \Omega} C(q\downarrow) \qquad [\text{Equation 11}]$$

Here, $k_C$ denotes a normalizing factor.

Here, a small enough value of average $\mu_{p\downarrow}$ of confidence map means depth value $D_p$ in the pixel p is uncertain. If average $\mu_{p\downarrow}$ of confidence map is large, variance $\sigma_{p\downarrow}^2$ is calculated for decision of local depth artifact by equation 12.

$$\sigma_{p\downarrow}^2 = \frac{1}{k_C} \sum_{q\downarrow \in \Omega} (C(q\downarrow) - \mu_{p\downarrow})^2 \qquad [\text{Equation 12}]$$

Here, a too small value of variance $\sigma_{p\downarrow}^2$ means depth value $D_p$ is certain. A too high value of the variance $\sigma_{p\downarrow}^2$ means that the pixel p is located in boundary of the object. When the variance $\sigma_{p\downarrow}^2$ is a value between a first reference value $T_{low}$ and a second reference value $T_{high}$, there are wrong depth data in the region $\Omega$. These wrong depth data are caused by low reflective texture, and then depth artifacts happens. For reducing the depth artifacts, the circumferential pixels in the first input image LDI are adaptively up-sampled by the up-sampling unit 350 according to the value of the variance $\sigma_{p\downarrow}^2$ by Equation 13.

$$\tilde{D}_P = \qquad [\text{Equation 13}]$$
$$\frac{1}{k_p} \sum_{q\downarrow \in \Omega} D_{q\downarrow} f(\|p\downarrow - q\downarrow\|) [\alpha(\Delta_\Omega) g(\|\tilde{I}_p - \tilde{I}_q\|) + (1 - \alpha(\Delta_\Omega))$$
$$h(\|I_{p\downarrow} - I_{q\downarrow}\|)] \cdot U(q\downarrow)$$

Here, $\tilde{I}_p$ denotes an intensity of a center pixel (p) of the second input image, $\tilde{I}_q$ denotes an intensity of a circumferential pixel (q) surrounding the center pixel of the second input image, $I_{p\downarrow}$ denotes an intensity of a center pixel (p) of the first input image, $I_{q\downarrow}$ denotes an intensity of a circumferential pixel (q) surrounding the center pixel of the second input image, $\Omega$ denotes region of the circumferential pixels (q), $p\downarrow$ and $q\downarrow$ respectively denote pixels corresponding to the center pixel (p) and the circumferential pixel (q) of the first input image, $D_{q\downarrow}$ denotes a depth value of the pixel ($q\downarrow$) in the first input image, $\tilde{D}_p$ denotes a depth value of the pixel (p) in the output image, f denotes a spatial filter kernel, g and h denote range filter kernels, $\alpha(\Delta_\Omega)$ denotes a blending function, $k_p$ denotes a normalizing factor, and $\Delta_\Omega$ denotes a difference of the maximum and minimum values of the depth value of the region of the circumferential pixels (q).

Here, $U(q\downarrow)$ may be represented by Equation 14.

$$U(q\downarrow) = \begin{cases} \frac{1}{1+e^{-\epsilon_4(C(q\downarrow) - \mu_{P\downarrow})}}, & \text{if } T_{low} < \sigma_{p\downarrow}^2 < T_{high} \\ \text{all } 1, & \text{otherwise} \end{cases} \qquad [\text{Equation 14}]$$

Referring to Equation 14, it is noted that $U(q\downarrow)$ has a value depending on the value of the variance $\sigma_{p\downarrow}^2$. Therefore, the result of Equation 13 varies according to the value of the variance $\sigma_{p\downarrow}^2$. That is, the resolution of the pixel p is increased considering the reflectance of the circumferential pixels q and the location of the pixel p according to example embodiments.

Figure 7:
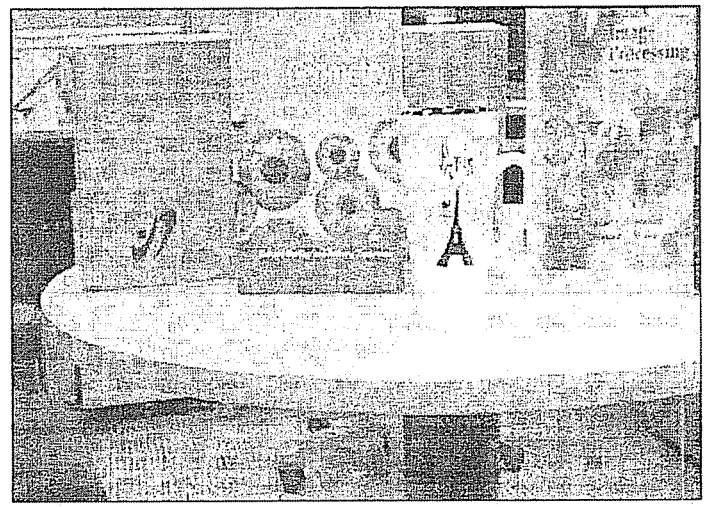
FIG. 7 illustrates a second input image provided from a second image sensor in FIG. 1.

FIG. 7 illustrates a second input image provided from the second image sensor in FIG. 1.

Figure 8:
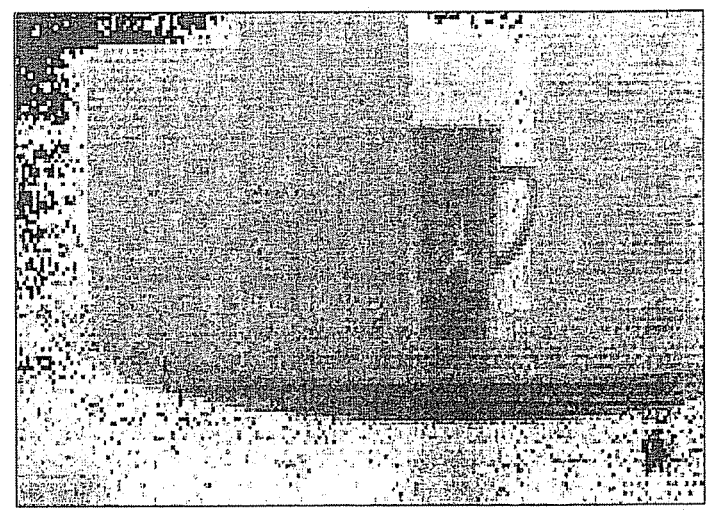
FIG. 8 illustrates a first input image provided from the second image sensor in FIG. 1.
Figure 9A:
FIGS. 9A through 9D respectively illustrate images that the first image are sampled at the sampling points.
Figure 9B:
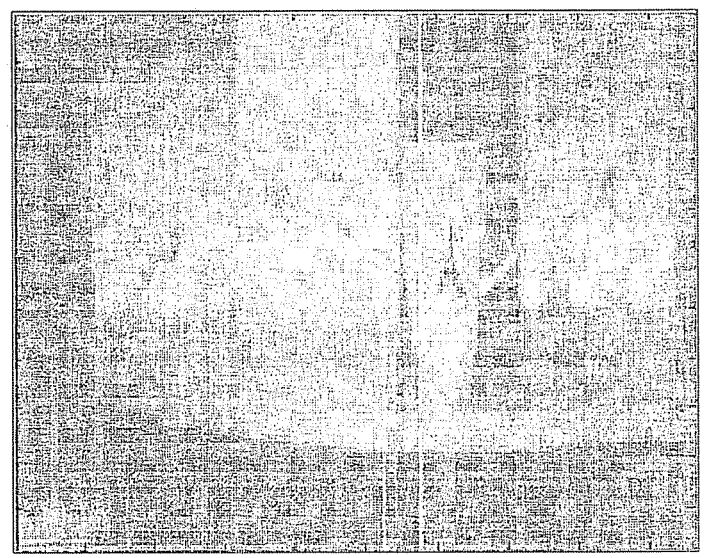
Figure 9C:
Figure 9D:
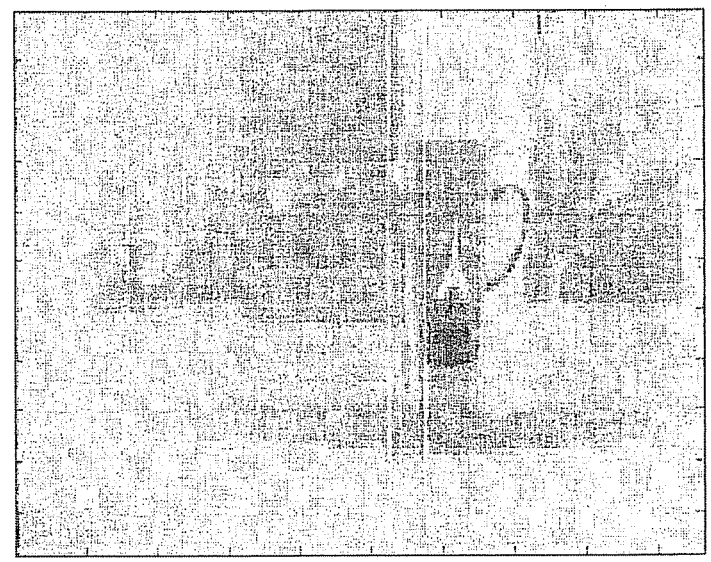

FIG. 8 illustrates a first input image provided from the first image sensor in FIG. 1.

Referring to FIGS. 7 and 8, it is noted that the second image sensor 200 provides the 2-D color image with the second resolution with respect to the object 20, and the first image sensor 100 provides the 3-D depth image with the first resolution with respect to the object 20. In addition, it is also noted that the first resolution of the first input image LDI is lower than the second resolution of the second input image HCI.

FIGS. 9A through 9D respectively illustrate images that the first image are sampled at the sampling points.

Referring to FIGS. 9A through 9D, the first input image LDI is represented as each of the images of FIGS. 9A through 9D, when the pixel array 110 may extract four samples A0, A1, A2 and A3 of the first received light RX1 at phases of about 90 degrees, about 180 degrees, about 270 degrees and about 360 degrees per period, respectively.

Figure 10:
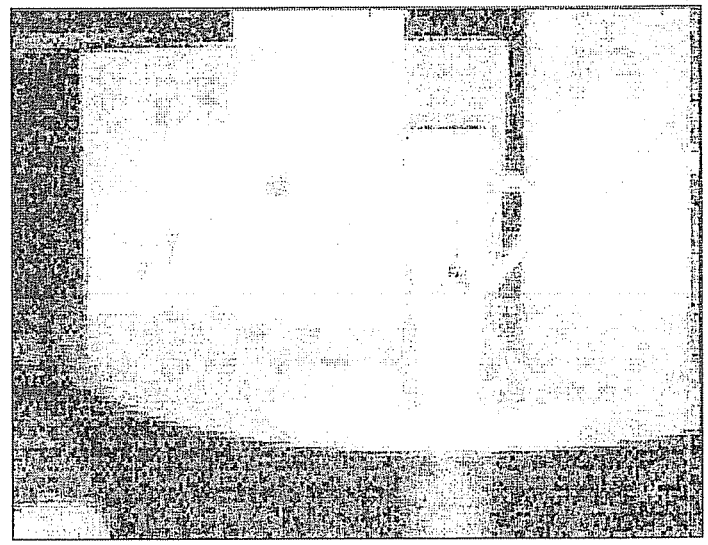
FIG. 10 illustrates a confidence map with respect to an object according to at least some example embodiments.

FIG. 10 illustrates a confidence map with respect to the object according to at least some example embodiments.

Figure 11:
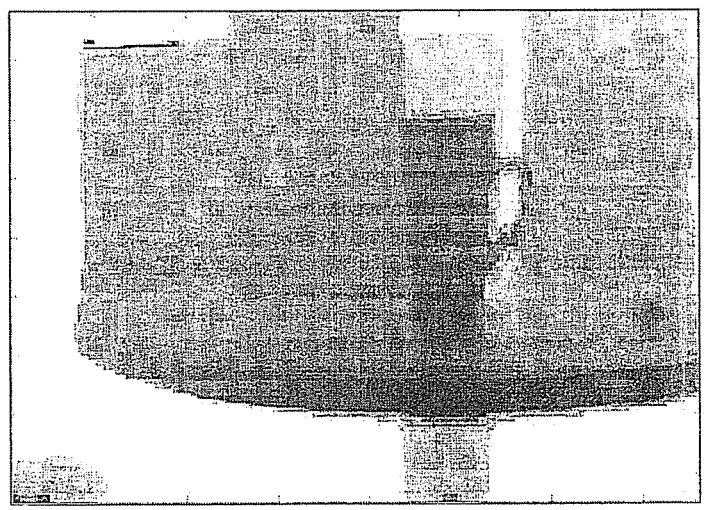
FIG. 11 illustrates an output image with respect to an object according to at least some example embodiments.

FIG. 11 illustrates an output image with respect to the object according to at least some example embodiments.

Figure 12A:
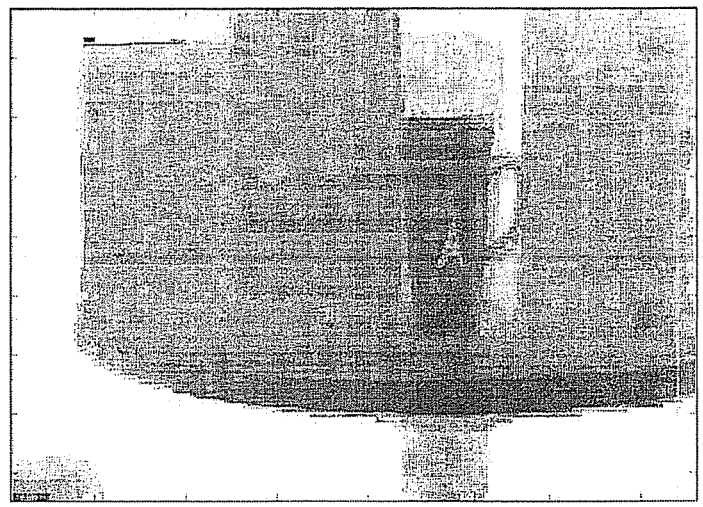
FIGS. 12A and 12B illustrate output images with respect to an object according to conventional techniques to be compared with the output image with respect to the object according to some example embodiments.
Figure 12B:
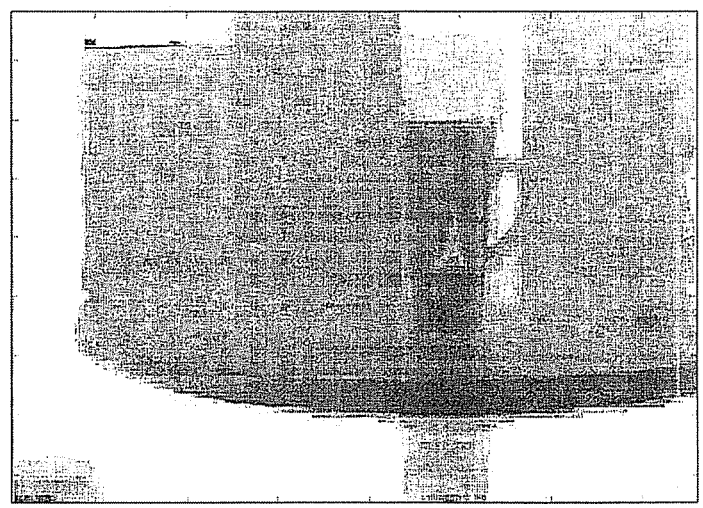

FIGS. 12A and 12B illustrate output images with respect to the object according to conventional techniques to be compared with the output image with respect to the object according to at least some example embodiments.

Referring again to FIG. 4, the confidence map estimation unit 330 estimates the confidence map CM based on the amplitude A, the offset B and the reconstruction error RE as illustrated in FIG. 10, the up-sampling unit 350 refers to the confidence map CM and performs an up-sampling on the depth data D of the phase difference $\Phi$ of the first input image LDI to increase the first resolution of the first input image LDI to the second resolution using Equation 13.

Referring to FIG. 11, a resolution of the depth data may be increased to a resolution of the color data, the noises may be reduced and the image of the boundary portions of the object may be enhanced.

FIG. 12A illustrates an image when the first input image is up-sampled by Equation 15.

$$\tilde{D}_P = \frac{1}{k_p} \sum_{q_\downarrow \in \Omega} D_{q_\downarrow} f(\|p_\downarrow - q_\downarrow\|) g(\|\tilde{I}_p - \tilde{I}_q\|)$$ [Equation 15]

Referring to FIG. 12A, it is noted that the depth artifacts occur because the texture of the object position at the same distance as the color image is copied when the first input image LDI is up-sampled by Equation 15.

FIG. 12B illustrates an image when the first input image is up-sampled by Equation 16.

$$\tilde{D}_P = \frac{1}{k_p} \sum_{q_\downarrow \in \Omega} D_{q_\downarrow} f(\|p_\downarrow - q_\downarrow\|) [\alpha(\Delta_\Omega) g(\|\tilde{I}_p - \tilde{I}_q\|) +$$

$$(1 - \alpha(\Delta_\Omega)) h(\|I_{P_\downarrow} - I_{q_\downarrow}\|)]$$ [Equation 16]

Referring to FIG. 12B, it is noted that the depth artifacts may be prevented by adaptively selecting a range domain of a color image with a high resolution and a depth map with a low resolution. However, the depth artifacts due to the low reflectance texture cannot be enhanced because the only the range domain of the depth map is used in Equation 16. The low reflectance texture may be identified as edges in Equation 16.

The images of FIGS. 11, 12A and 12B have the second resolution as the image of FIG. 7.

Figure 13:
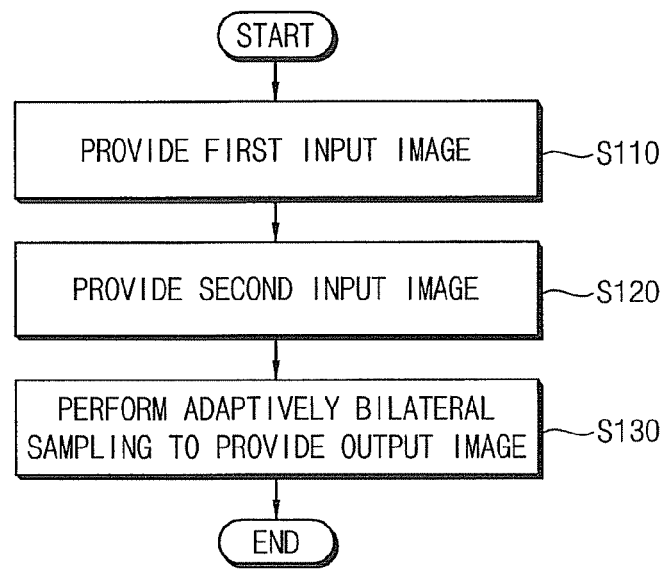
FIG. 13 is a flow chart illustrating a method of processing images according to at least some example embodiments.

FIG. 13 is a flow chart illustrating a method of processing images according to at least some example embodiments.

Hereinafter, there will be description of a method of processing an image according to at least some example embodiments with reference to FIGS. 1, 4 and 13. However, it should be understood that the method of FIG. 13 is not limited to the devices shown in FIGS. 1 and 4 and may be implemented by other image processing systems.

For the method of processing images, the first image sensor 100 emits the light TX to the object 20 to provide the first input image LDI based on a first received light RX1 reflected from the object 20 (S110). In some example embodiments, the first image sensor 100 may be a three-dimensional (3-D) time-of-flight (TOF) image sensor, and the first input image LDI may be 3-D depth image. The second image sensor 200 provides a second input image HCI having a second resolution higher than a first resolution of the first input image LDI, based on a second received light RX2 reflected from the object 20 (S120). The second image sensor 200 may be a two-dimensional (2-D) color image sensor, and the second input image HCI may be 2-D color image. The up-sampling unit 350 adaptively performs a joint bilateral up-sampling on depth information of the phase difference Φ of the first input image based on the confidence map CM of the first input image LDI and the second input image HCI and increases the first resolution of the first input image LDI to the second resolution to provide an output image HDI with the second resolution (S130). For providing the output image HDI, the first received light RX1 is sampled multiple times at regular sampling points of the emitted light TX during one period of the emitted light TX, and amplitude A and offset B are calculated. The first received light RX1 is reconstructed based on a phase difference Φ between the emitted light TX and the first received light RX1, and the reconstruction error RE corresponding to intensity differences between the sampling points of the first received light RX1 and the sampling points of the reconstructed first received light are calculated. The confidence map CM is estimated based on the amplitude A, the offset B and the reconstruction error RE. The first input image LDI is up-sampled based on the confidence map CM. The up-sampling may be performed using Equation 13.

Figure 14:
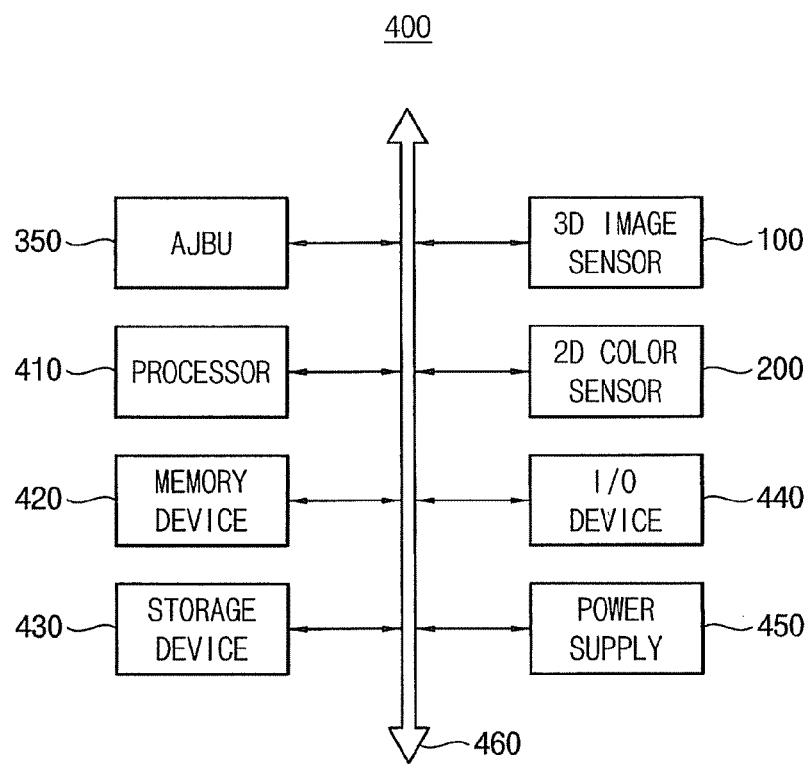
FIG. 14 is a block diagram illustrating a computing system including an image processing system according to at least some example embodiments.

FIG. 14 is a block diagram illustrating a computing system including an image processing system according to at least some example embodiments.

Referring to FIG. 14, a computing system 400 includes the first image sensor 100, The second image sensor 200, the up-sampling unit 350, a processor 410, a memory device 420, a storage device 430, an input/output device 440, and a power supply. Although it is not illustrated in FIG. 14, the computing system 400 may further include a port for communicating with electronic devices, such as a video card, a sound card, a memory card, a USB device, etc.

The processor 410 may perform specific calculations or tasks. For example, the processor 410 may be a microprocessor, a central processing unit (CPU), a digital signal processor, or the like. The processor 410 may communicate with the memory device 420, the storage device 430 and the input/output device 440 via a bus 460 including an address bus, a control bus and/or a data bus. The processor 410 may be coupled to an extension bus, such as a peripheral component interconnect (PCI) bus. The memory device 420 may store data for operating the computing system 400. For example, the memory device 420 may be implemented by a dynamic random access memory (DRAM), a mobile DRAM, a static random access memory (SRAM), a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The storage device 430 may include a solid state drive, a hard disk drive, a CD-ROM, etc. The input/output device 440 may include an input device, such as a keyboard, a mouse, a keypad, etc., and an output device, such as a printer, a display device, etc. The power supply 450 may supply power to the computing system 400.

The first image sensor 100 and the second image sensor 200 may be coupled to the processor 410 or the up-sampling unit 350 via the buses 460 or other communication links. As described above, the first image sensor 100 provides a confidence map based on a first input image with a first resolution, with respect to an object, the second image sensor 200 provide a second input image with a second resolution, with respect to the object, the up-sampling unit 350 performs an up-sampling on depth data of phase difference Φ of the first input image to increase the first resolution of the first input image to the second resolution. The up-sampling unit 350 may be integrated in the processor 410.

In some example embodiments, the first image sensor 100, the second image sensor 200, and the image processing device 300 and/or components of the first image sensor 100, the second image sensor 200 and the image processing device 300 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi-chip package (MCP), wafer-level fabricated package (WFP), or wafer-level processed stack package (WSP).

The computing system 400 may be any computing system including the first image sensor 100, the second image sensor 200, and the image processing device 300. For example, the computing system 400 may include a digital camera, a mobile phone, a smart phone, a personal digital assistant (PDA), a portable multimedia player (PMP), etc.

Figure 15:
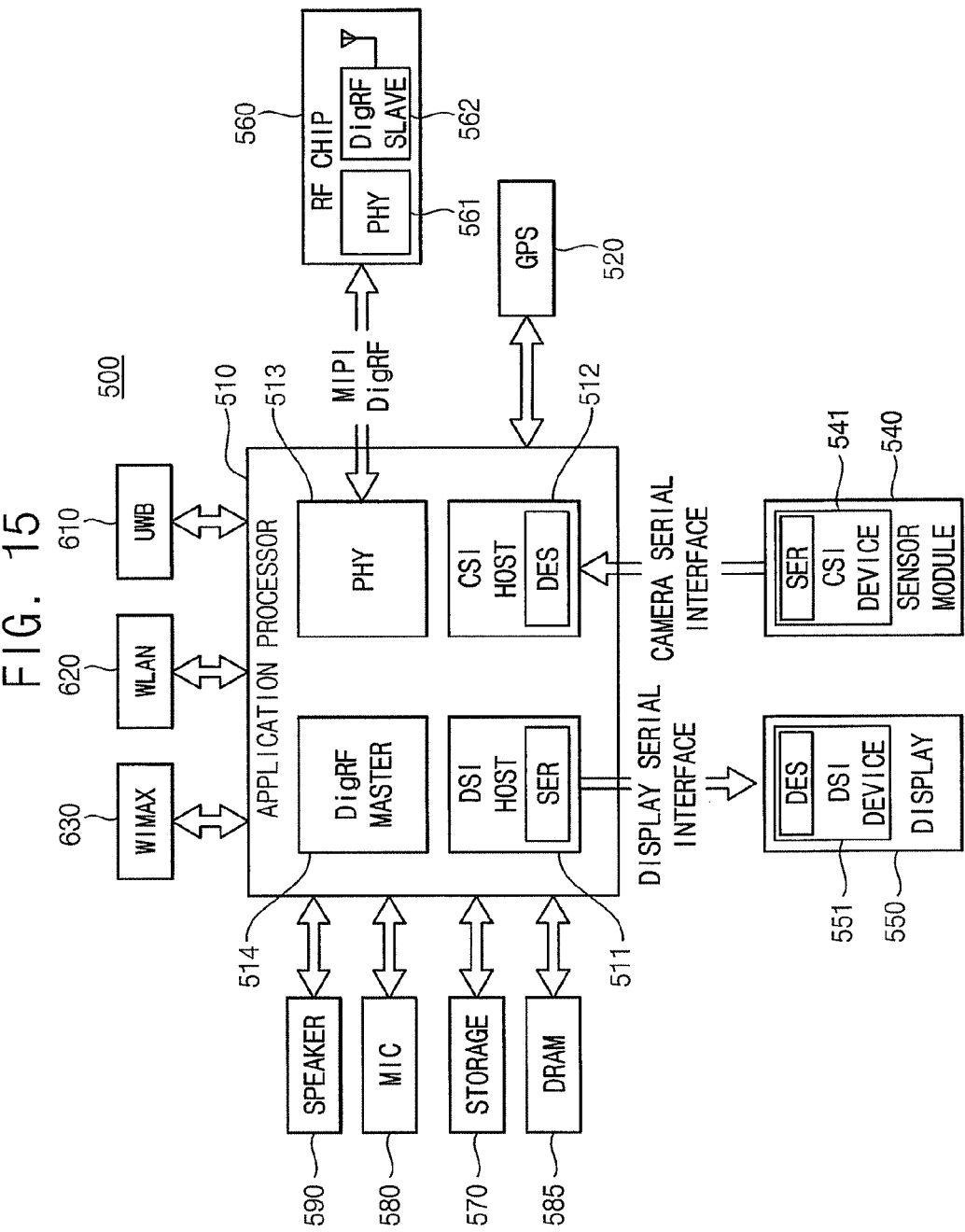
FIG. 15 is a block diagram illustrating an example of an interface used in a computing system of FIG. 14.

FIG. 15 is a block diagram illustrating an example of an interface used in a computing system.

Referring to FIG. 15, a computing system 500 may employ or support a Mobile Industry Processor Interface (MIPI), and may include an application processor 510, an image sensor module 540 and a display device 550. A CSI host 512 of the application processor 510 may perform a serial communication with a CSI device 541 of the image sensor module 540 using a camera serial interface (CSI). In some example embodiments, the CSI host 512 may include a deserializer DES, and the CSI device 541 may include a serializer SER. A DSI host 511 of the application processor 510 may perform a serial communication with a DSI device 551 of the display device 550 using a display serial interface (DSI). In some example embodiments, the DSI host 511 may include a serializer SER, and the DSI device 551 may include a deserializer DES.

The computing system 500 may further include a radio frequency (RF) chip 560. A PHY 513 of the application processor 510 may perform data transfer with a PHY 561 of the RF chip 560 using a MIPI DigRF. The PHY 513 of the application processor 510 may include a DigRF MASTER 514 for controlling the data transfer with the PHY 561 of the RF chip 560. The computing system 500 may further include a global positioning system (GPS) 520, a storage device 570, a microphone 580, a DRAM 585 and a speaker 590. The computing system 500 may communicate with external devices using an ultra-wideband (UWB) communication 610, a wireless local area network (WLAN) communication 620, a worldwide interoperability for microwave access (WIMAX) communication 630, etc. Inventive concepts may not be limited to configurations or interfaces of the computing systems 400 and 500 illustrated in FIGS. 14 and 15.

Inventive concepts may be applied to any three-dimensional image sensor or any system including image sensors, such as a computer, a digital camera, a three-dimensional camera, a mobile phone, a personal digital assistant (PDA), a scanner, a navigator, a video phone, a monitoring system, an auto focus system, a tracking system, a motion capture system, an image stabilizing system, etc.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages of inventive concepts. Accordingly, all such modifications are intended to be included within the scope of inventive concepts as defined in the claims. Therefore, it is to be understood that the foregoing is illustrative of various example embodiments and is not to be construed as limited to specific example embodiments disclosed, and that modifications to the disclosed example embodiments, as well as other example embodiments, are intended to be included within the scope of the appended claims.

What is claimed is:

1. An image processing system comprising:
at least one memory configured to store instructions to,
calculate a phase difference between an emitted light and a first received light reflected from an object due to the emitted light, and calculate an amplitude indicating an intensity of the first received light and calculate an offset of the first received light,
reconstruct the first received light based on the phase difference and configured to provide a reconstruction error, the reconstruction error corresponding to intensity differences between sampling points of the first received light and corresponding sampling points of the reconstructed first received light, determine a confidence map based on the amplitude, the offset and the reconstruction error, the confidence map associated with a first input image generated based on the first received light, the first input image having a first resolution, and perform a joint bilateral up-sampling on depth information of the first input image based on the confidence map and a second input image of the object, and increase the first resolution of the first input image to a second resolution to provide an output image with the second resolution; and at least one processor configured to execute the instructions.

2. The image processing system of claim 1, wherein the second input image has the second resolution.

3. The image processing system of claim 1, wherein the first input image is a three-dimensional (3-D) depth image with respect to the object and the second input image is a two-dimensional (2-D) color image with respect to the object.

4. The image processing system of claim 1, wherein the output image is a three-dimensional (3-D) depth image with respect to the object.

5. The image processing system of claim 1, wherein the processor is configured to execute the joint bilateral up-sampling by $$\tilde{D}_p = \frac{1}{k_p} \sum_{q_\downarrow \in \Omega} D_{q_\downarrow} f(\|p_\downarrow - q_\downarrow\|) [\alpha(\Delta_\Omega) g(\|\tilde{I}_p - \tilde{I}_q\|) + (1 - \alpha(\Delta_\Omega)) h(\|I_{p_\downarrow} - I_{q_\downarrow}\|)] \cdot U(q_\downarrow)$$

wherein $\tilde{I}_p$ denotes intensity of a center pixel of the second input image, $\tilde{I}_q$ denotes an intensity of a circumferential pixel surrounding the center pixel of the second input image, $I_{p_\downarrow}$ denotes an intensity of a center pixel of the first input image, $I_{q_\downarrow}$ denotes an intensity of a circumferential pixel of the first input image, $\Omega$ denotes a region of the circumferential pixels, $p_\downarrow$ and $q_\downarrow$ respectively denote pixels corresponding to the center pixel and the circumferential pixel of the first input image, $D_{q_\downarrow}$ denotes a depth value of the corresponding pixel in the first input image, $\tilde{D}_p$ denotes a depth value of the corresponding pixel in the output image, f denotes a spatial filter kernel, g and h denote range filter kernels, $\alpha(\Delta_\Omega)$ denotes a blending function, $k_p$ denotes a normalizing factor and $U(q_\downarrow)$ is expressed by $$U(q_\downarrow) = \begin{cases} \dfrac{1}{1 + e^{-\varepsilon_4(C(q_\downarrow) - \mu_{p_\downarrow})}}, & \text{if } T_{low} < \sigma_{p_\downarrow}^2 < T_{high} \\ \text{all } 1, & \text{otherwise} \end{cases}$$

wherein $$\mu_{p\downarrow} = \frac{1}{k_C} \sum_{q\downarrow \in \Omega} C(q\downarrow), \sigma_{p\downarrow}^2 = \frac{1}{k_C} \sum_{q\downarrow \in \Omega} (C(q\downarrow) - \mu_{p\downarrow})^2$$

and C(q↓) denotes the confidence map.

6. The image processing system of claim 5, wherein the confidence map C(q↓) is expressed by $$C(q\downarrow) = w_A C_A + w_B C_B + w_{RE} C_{RE},$$

wherein $$C_A = \frac{1}{1 + e^{-\varepsilon_1 \cdot (A - \tau_1)}},$$

$C_B = e^{-(B-\tau_2)^2/\epsilon_2^2}$, $C_{RE} = e^{-\epsilon_3 \cdot RE}$, A is the amplitude, B is the offset, R is the reconstruction error, $\tau_1, \tau_2$ denote center values, $\epsilon_1, \epsilon_2, \epsilon_3$ denote constants determining slopes of $C_A, C_B$ and $C_{RE}$ and $w_A, w_B$ and $w_R$ denote weights to $C_A$, $C_B$ and $C_{RE}$, respectively.

7. The image processing system of claim 5, wherein each of f, g and h denotes a Gaussian function.

8. The image processing system of claim 5, wherein the blending function $\alpha(\Delta_\Omega)$ is expressed by $$\alpha(\Delta_\Omega) = \frac{1}{1 + e^{-\varepsilon(\Delta_\Omega - \tau)}},$$

wherein the $\Delta_\Omega$ denotes a difference of the maximum and minimum depth values of the region of the circumferential pixels.

9. The image processing system of claim 1, wherein processor is configured to execute the joint bilateral up-sampling based on reflectances of pixels of an image sensor configured to generate the first input image.

10. An image processing system comprising:
a first image sensor including a light source module, the first image sensor configured to generate a first input image with a first resolution based on a first received light reflected from an object due to an emitted light from the light source module, the first image sensor further configured to provide a confidence map with respect to a first input image based on the first received light, the first image sensor including,
at least one first memory configured to store first instructions to,
calculate a phase difference of the first received light, calculate an amplitude indicating an intensity of the first received light and calculate an offset of the first received light,
reconstruct the first received light based on the phase difference and configured to provide a reconstruction error corresponding to intensity differences between sampling points of the first received light and corresponding sampling points of the reconstructed first received light, and
determine the confidence map based on the amplitude, the offset and the reconstruction error;
a second image sensor configured to provide a second input image based on a second received light reflected from the object, the second image having a second resolution higher than the first resolution;
at least one second memory configured to store second instructions to,
perform a joint bilateral up-sampling on depth information of the first input image based on the confidence map and the second input image, and provide an output image with the second resolution based on the up-sampling; and
at least one processor configured to execute the first and second instructions.

11. The image processing system of claim 10, wherein the processor is configured to calculate the amplitude and the offset by sampling the first received light at sampling points of the emitted light during one period of the emitted light.

12. The image processing system of claim 10, wherein the first input image is a three-dimensional (3-D) depth image with respect to the object and the second input image is a two-dimensional (2-D) color image with respect to the object.

13. The image processing system of claim 10, wherein the output image is a three-dimensional (3-D) depth image with respect to the object.

* * * * *